US010744833B2

(12) United States Patent
Gell et al.

(10) Patent No.: US 10,744,833 B2
(45) Date of Patent: Aug. 18, 2020

(54) INDEPENDENT SUSPENSION

(71) Applicant: ZF FRIEDRICHSHAFEN AG, Friedrichshafen (DE)

(72) Inventors: Klaus Gell, Obernzell (DE); Johann Wimmer, Newburg am Inn (DE)

(73) Assignee: ZF Friedrichshafen AG, Friedrichshafen (DE)

(*) Notice: Subject to any disclaimer, the term of this patent is extended or adjusted under 35 U.S.C. 154(b) by 224 days.

(21) Appl. No.: 15/735,366

(22) PCT Filed: May 23, 2016

(86) PCT No.: PCT/EP2016/061527
§ 371 (c)(1),
(2) Date: Dec. 11, 2017

(87) PCT Pub. No.: WO2016/206883
PCT Pub. Date: Dec. 29, 2016

(65) Prior Publication Data
US 2018/0170136 A1  Jun. 21, 2018

(30) Foreign Application Priority Data
Jun. 23, 2015 (DE) .................. 10 2015 211 529

(51) Int. Cl.
*B60G 7/04* (2006.01)
*B62D 7/18* (2006.01)
(Continued)

(52) U.S. Cl.
CPC .............. *B60G 7/008* (2013.01); *B60G 3/20* (2013.01); *B60G 7/001* (2013.01); *B60G 15/00* (2013.01);
(Continued)

(58) Field of Classification Search
CPC .......... B60G 3/20; B60G 3/265; B60G 7/001; B60G 7/008; B60G 7/04; B60G 11/16;
(Continued)

(56) References Cited

U.S. PATENT DOCUMENTS 5,026,090 A * 6/1991 Sekino .................. B62D 17/00
 267/189
5,192,100 A * 3/1993 Rumpel ................. B60G 11/56
 280/124.143
(Continued)

FOREIGN PATENT DOCUMENTS

DE 102007047789 5/2009
DE 102008044103 6/2010
EP 2246204 11/2010

OTHER PUBLICATIONS

'Independent Truck Suspension IS 80 TF'. Webpage [online]. ZF Friedrichshafen AG[retrieved on Sep. 11, 2013]. Retrieved from Internet: <URL: https://web.archive.org/web/20130911084008/http://www.zf.com:80/corporate/en/products/product_range/commercial_vehicles/independent_truck_suspension_is_80_tf.html>. (Year: 2013).*

*Primary Examiner* — Barry Gooden, Jr.
(74) *Attorney, Agent, or Firm* — Cozen O'Connor

(57) ABSTRACT

An independent wheel suspension includes a knuckle which is supported on a spring support connected to a vehicle body. The knuckle is connected to the spring support via a knuckle pin and is arranged so as to be mounted rotatably around a longitudinal axis A of the knuckle pin. The transverse control arms are mounted at the upper end and lower end, respectively, of the knuckle pin. The spring support is connected to the knuckle pin so as to be fixed with respect to rotation relative to it so that the knuckle pin connects the spring support, the knuckle and the upper transverse control arm and lower transverse control arm together. The independent wheel suspension has a further safety component (Continued)

which prevents the knuckle pin from rotating in an uncontrolled manner around its longitudinal axis A.

7 Claims, 7 Drawing Sheets

(51) Int. Cl.
*B60G 3/20* (2006.01)
*B60G 7/00* (2006.01)
*B60G 21/055* (2006.01)
*B60G 15/00* (2006.01)

(52) U.S. Cl.
CPC ........... *B60G 21/0551* (2013.01); *B62D 7/18* (2013.01); *B60G 2200/144* (2013.01); *B60G 2200/44* (2013.01); *B60G 2200/462* (2013.01); *B60G 2204/129* (2013.01); *B60G 2204/1224* (2013.01); *B60G 2204/416* (2013.01); *B60G 2204/422* (2013.01); *B60G 2206/50* (2013.01)

(58) Field of Classification Search
CPC .... B60G 13/005; B60G 13/006; B60G 15/07; B60G 2200/462; B60G 2200/4622; B60G 2200/4222; B60G 2200/43; B62D 17/00; B62D 19/00
See application file for complete search history.

(56) References Cited

U.S. PATENT DOCUMENTS

| | | | | |
|---|---|---|---|---|
| 5,496,055 | A * | 3/1996 | Shibahata | B60G 3/265 267/188 |
| 7,699,326 | B2 * | 4/2010 | Yamada | B60G 3/01 280/124.125 |
| 7,891,674 | B2 * | 2/2011 | Vaxelaire | B60G 7/001 280/5.524 |
| 8,205,896 | B2 * | 6/2012 | Gell | B60G 3/20 280/124.135 |
| 2002/0050694 | A1* | 5/2002 | Mikasa | B60G 3/06 280/86.758 |
| 2004/0046349 | A1* | 3/2004 | Ackley | B60G 3/18 280/124.135 |
| 2005/0006868 | A1 | 1/2005 | Ziech | |
| 2008/0203693 | A1* | 8/2008 | Yamada | B60G 3/01 280/124.127 |
| 2010/0052271 | A1* | 3/2010 | Vaxelaire | B60G 7/001 280/5.524 |
| 2010/0264616 | A1 | 10/2010 | Gell et al. | |
| 2015/0197128 | A1* | 7/2015 | Miller | B60G 7/003 280/86.753 |
| 2017/0015173 | A1* | 1/2017 | Battaglia | B60G 3/18 |
| 2017/0297396 | A1* | 10/2017 | Drotar | B60G 3/20 |
| 2018/0001725 | A1* | 1/2018 | Andou | B60G 3/28 |
| 2018/0237070 | A1* | 8/2018 | Lorenz | B60G 7/02 |
| 2019/0232749 | A1* | 8/2019 | Di Tanna | B60G 3/20 |

* cited by examiner

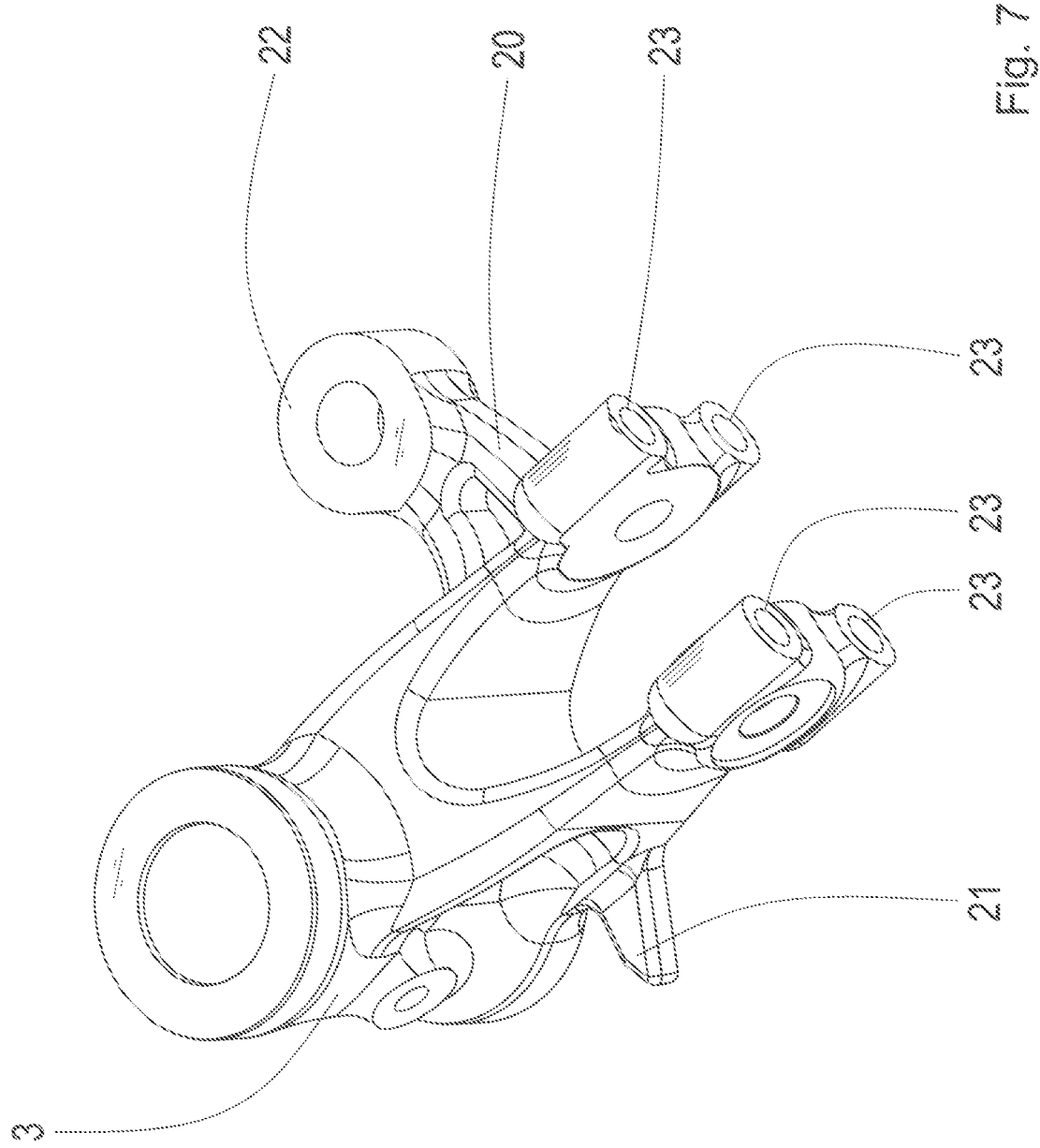

INDEPENDENT SUSPENSION

PRIORITY CLAIM

This is a U.S. national stage of application No. PCT/EP2016/061527, filed on May 23, 2016. Priority is claimed on the following application: Country: Germany, Application No.: 10 2015 211 529.1, filed: Jun. 23, 2015; the content of which is/are incorporated herein by reference in its entirety.

FIELD OF THE INVENTION

The invention is directed to an independent wheel suspension comprising a knuckle which is supported on a spring support. The spring support is connected to a vehicle body via a vibration damper and a supporting spring or via a spring-damper module. The knuckle is connected to the spring support via a knuckle pin and is arranged so as to be mounted rotatably around a longitudinal axis of the knuckle pin. The independent wheel suspension further has at least one upper wishbone or transverse control arm and at least a lower transverse control arm which are mounted at the upper end and lower end, respectively, of the knuckle pin. The knuckle pin and the transverse control arms are mounted in each instance by means of a joint operative along three axes, for example, a ball joint or a molecular joint. The knuckle pin accordingly connects the spring support, the knuckle and the upper and lower transverse control arms together. The spring support is generally connected to the knuckle pin so as to be fixed with respect to rotation relative to it.

BACKGROUND OF THE INVENTION

A generic independent wheel suspension is disclosed, for example, in US2010264616, the entire content of which is hereby incorporated reference.

In the independent wheel suspensions of the generic type mentioned above, a joint operative along three axes such as, for example, a ball joint or a molecular joint, is used for bearing support of the transverse control arms. This is particularly advantageous because the freedom of movement of the transverse control arms is not unnecessarily limited by the bearing, and a tilting of the vehicle chassis due to one transverse control arm being at an inclination to the other transverse control arm can be compensated.

However, because of the three-axis action of a ball joint or molecular joint, a turning of the knuckle pin around its own longitudinal axis cannot be ruled out.

When the knuckle pin rotates, the spring support which is connected to the knuckle pin so as to be fixed with respect to rotation relative to it rotates along with it. Since the vibration damper or the spring-damper module is connected to the spring support, the vibration damper or the spring-damper module takes on an inclined position when the knuckle pin rotates in this manner, which diminishes the functionality of the module or vibration damper and introduces an additional transverse force into the piston rod of the vibration damper, which can lead in the long term to leakiness in the piston rod guide.

Beyond this, it cannot be ruled out that during a steering movement a spring support rotated in this way will collide with a brake arrangement normally arranged at the knuckle. Furthermore, with certain kinematic configurations impermissible transverse forces can result in the joints of the knuckle pin bearing, which could damage the latter.

Therefore, it is an object of this invention is to provide an independent wheel suspension of the generic type described above which does not permit the knuckle pin to rotate in an uncontrolled manner around its own longitudinal axis.

SUMMARY OF THE INVENTION

This object is met in that the independent wheel suspension has a safety component which prevents the knuckle pin from rotating in an uncontrolled manner around its longitudinal axis.

Further advantageous constructional variants are indicated in the figures and in the detailed description below.

BRIEF DESCRIPTION OF THE DRAWINGS

The invention will be described more fully referring to the following drawings in which:

FIG. 7 is a perspective view of a spring support according to FIG. 4 and FIG. 5 comprising fastening arrangement for fastening a stabilizer.

DETAILED DESCRIPTION OF THE PRESENTLY PREFERRED EMBODIMENTS

Figure 1:
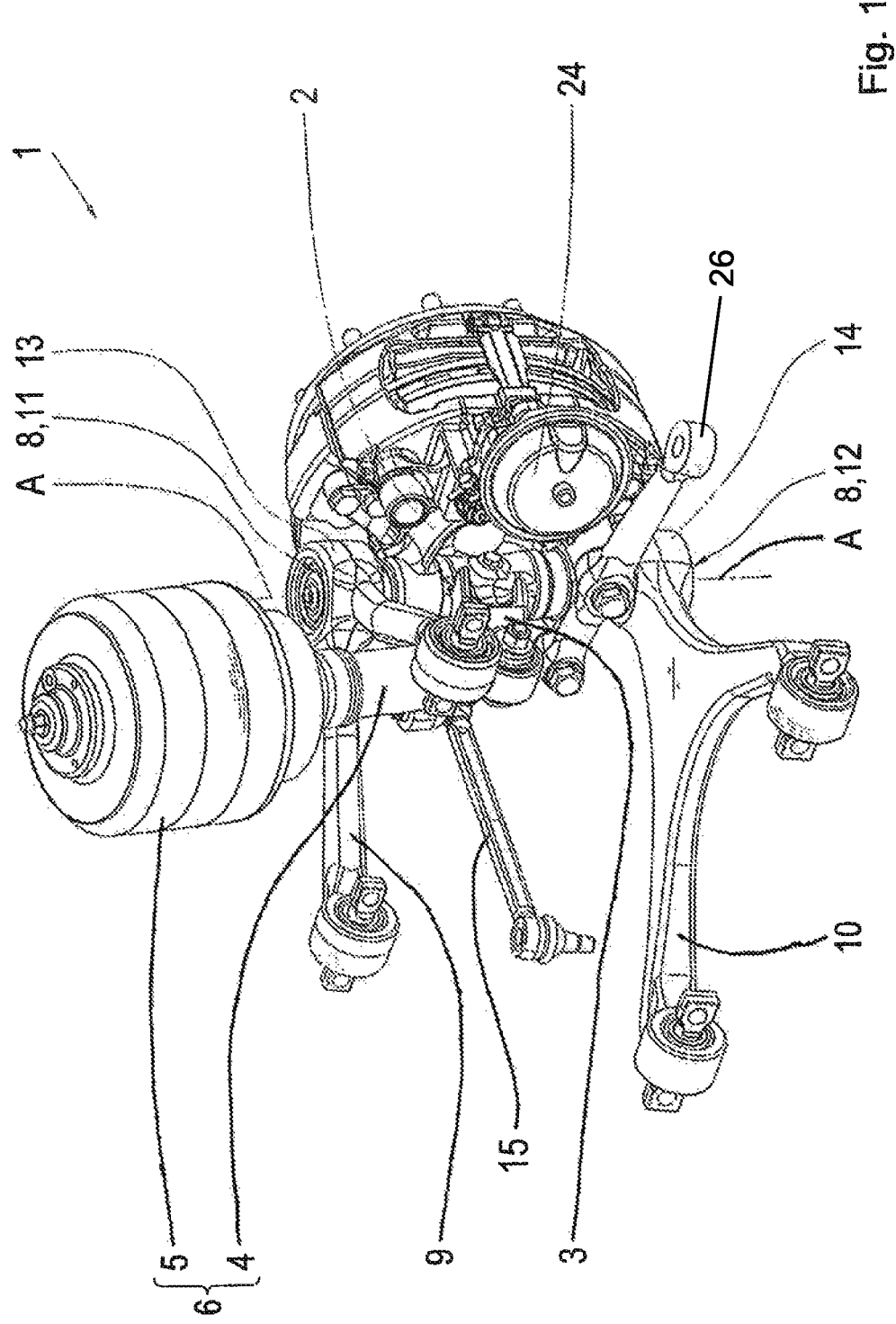
FIG. 1 a perspective view of the independent wheel suspension.

FIG. 1 is a perspective view from the ends of the control arms showing the independent wheel suspension 1 with safety component 15 as is further described in more detail below. It comprises a knuckle 2 which is supported on a spring support 3. The spring support 3 is to be connected to a vehicle body 7 via a spring-damper module 6. The vehicle body 7 is not shown in FIG. 1 for the sake of clarity but is at least suggested in FIG. 2. The spring-damper module 6 shown in FIG. 1 comprises a vibration damper 4 and a supporting spring which is arranged at the latter and which corresponds to the arrangement of a conventional pneumatic spring. Of course, a simple helical spring or any other suitable supporting spring known to the person skilled in the art can be used in this capacity instead of the pneumatic spring. Further, it is also possible to use a vibration damper 4 and a separate supporting spring 5 instead of a combined spring-damper module 6.

The knuckle 2 is connected to the spring support 3 via a knuckle pin 8 and is arranged so as to be mounted rotatably around a longitudinal axis (A) of the knuckle pin 8.

An upper transverse control arm 9 is arranged at the upper end 11 of the knuckle pin 8 and a lower transverse control arm 10 is arranged at the lower end 12 of the knuckle pin 8. The upper transverse control arm 9 and lower transverse control arm 10 are mounted in each instance by a joint 13; 14 operative along three axes. By "joint operative along three axes" is meant a joint which permits movement in any direction, for example, a ball joint, a molecular joint or any other suitable joint known to the person skilled in the relevant art. Further, a brake arrangement 24 and steering arm 26 are arranged at the knuckle 2.

The spring support 3 is connected to the knuckle pin 8 so as to be fixed with respect to rotation relative to it. Accordingly, the knuckle pin 8 connects the spring support 3, knuckle 2 and the upper and lower transverse control arms 9; 10 together. The non-rotational or torque proof connection of the spring support 3 with the knuckle pin 8 can be implemented by an interference fit or can be a different connection, for example, a bonding connection, positive-engagement connection or frictional-engagement connection.

Figure 2:
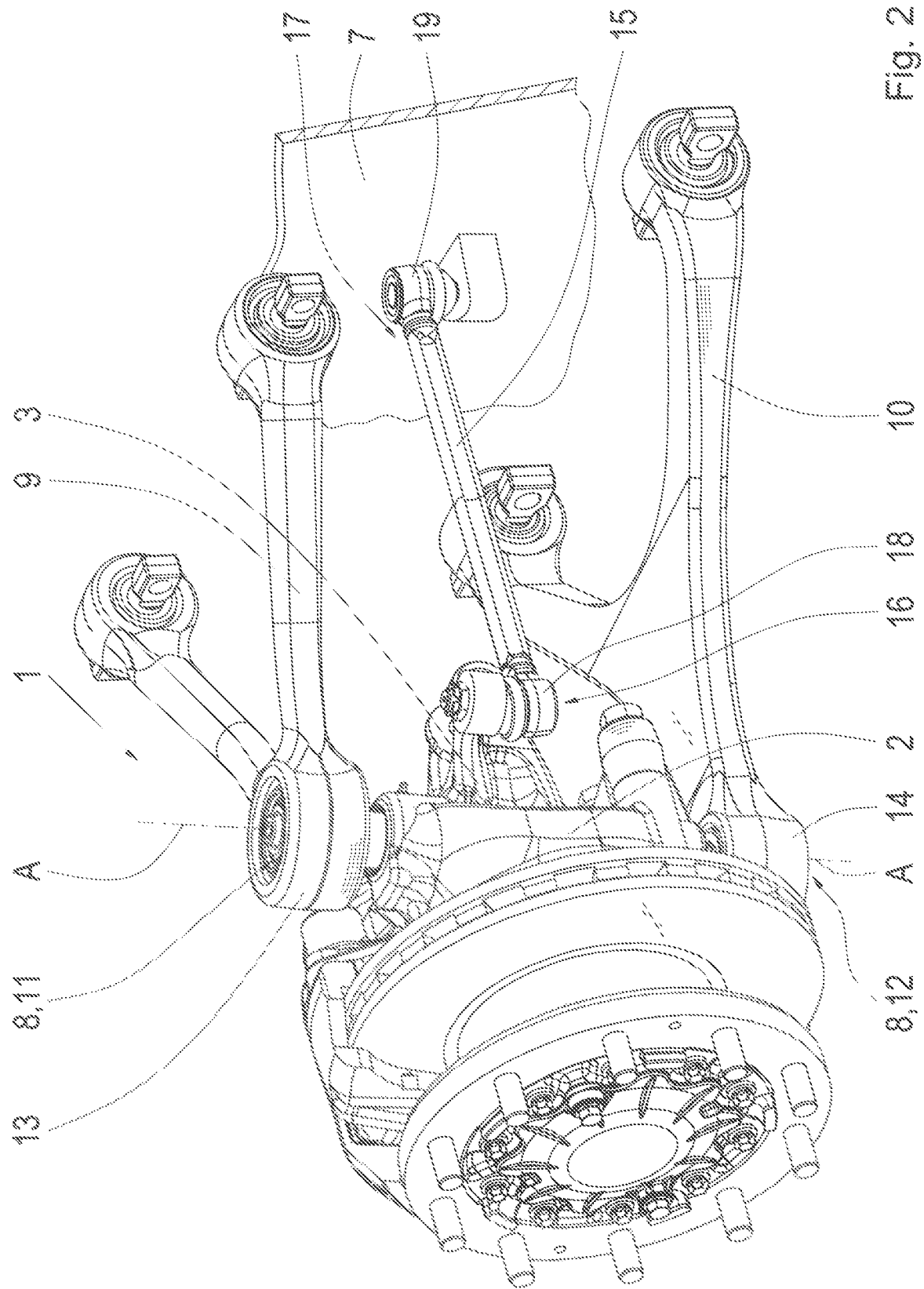
FIG. 2 is a perspective view of a possible constructional variant of an independent wheel suspension according to the present invention.

In contrast to FIG. 1, the spring-damper module is omitted from FIG. 2 to improve clarity. FIG. 2 shows a side view of the independent wheel suspension 1 and the safety component 15. The safety component 15 is constructed as a strut which is produced from a rigid basic material and which extends from the spring support 3 to the vehicle body 7. The safety component 15 is mounted at the spring support by a first end portion 16 thereof on the one hand and at a further component part of the vehicle body 7 by a second end portion 17 thereof on the other hand. As a result of the co-rotational connection of the spring support 3 to the knuckle pin 8, the safety component 15 prevents the knuckle pin 8 from rotating around its own longitudinal axis A in an uncontrolled manner.

Figure 3:
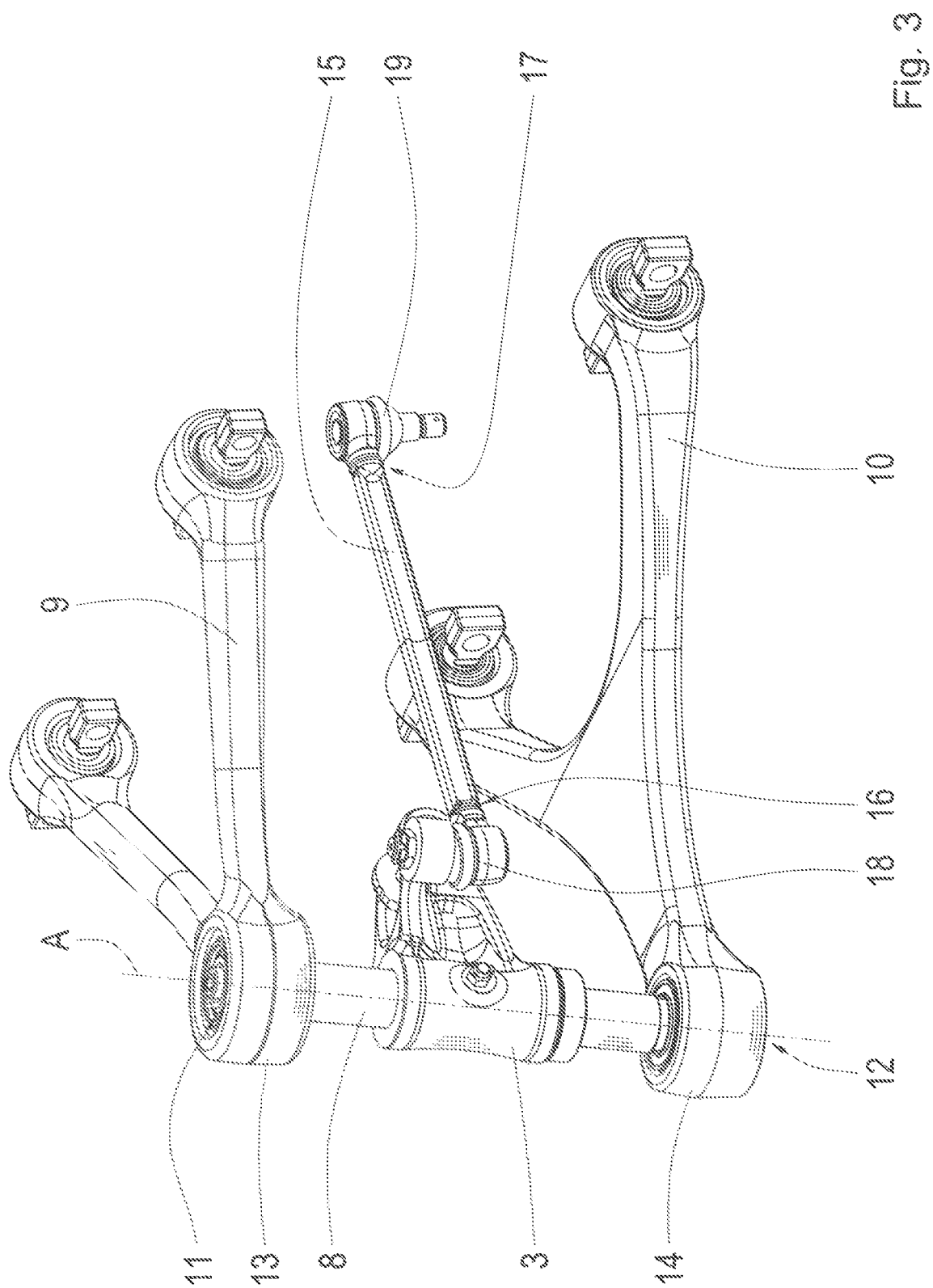
FIG. 3 is a perspective view of a partial arrangement according to FIG. 2 comprising transverse control arms, knuckle pin, spring support and safety component.

Further, FIG. 2 shows that a joint 18; 19, respectively, which is operative along three axes has been used at the two bearing points of the safety component 15. It is possible to use at this location a joint that is operative along one axis, although this is not shown in the figures. Although not shown in FIG. 2, the independent wheel suspension includes a knuckle as shown in FIG. 1. The bearing support of the safety element 15 at the spring support 3 and the arrangement of the end portions 16; 17 are shown still more clearly in FIG. 3.

Figure 4:
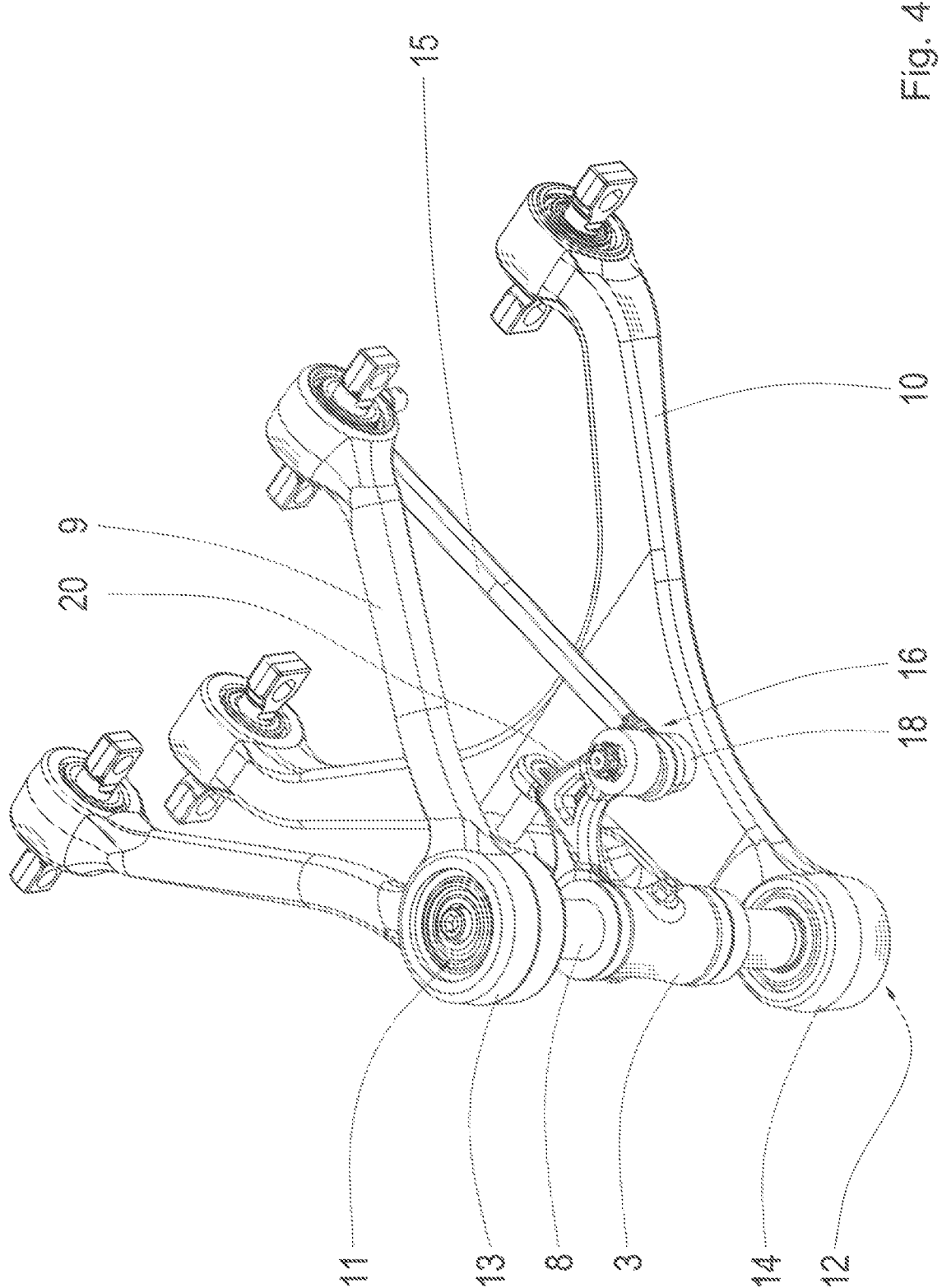
FIG. 4 is a perspective view according to FIG. 3 comprising a fastening lever.

FIG. 4 shows an arrangement comprising a knuckle pin 8, an upper transverse control arm 9 and a lower transverse control arm 10 which are mounted, respectively, at upper end 11 and a lower end 12 of the knuckle pin 8 by two joints 13; 14 operative along three axes. Between the two transverse control arms 9; 10, a spring support 3 is arranged at the knuckle pin 8 so as to be fixed with respect to rotation relative to it.

The spring support 3 comprises a fastening lever 20 for fastening the safety component 15 to the spring support 3. The fastening lever 20 is formed integral with the spring support 4 and has at its end a fastening opening 25 for connecting a safety component 15 to the fastening lever 20 and therefore also to the spring support 3. Further, the length of the fastening lever 20 defines the working distance X of the safety component 15 from the longitudinal axis A of the knuckle pin 8.

Figure 5:
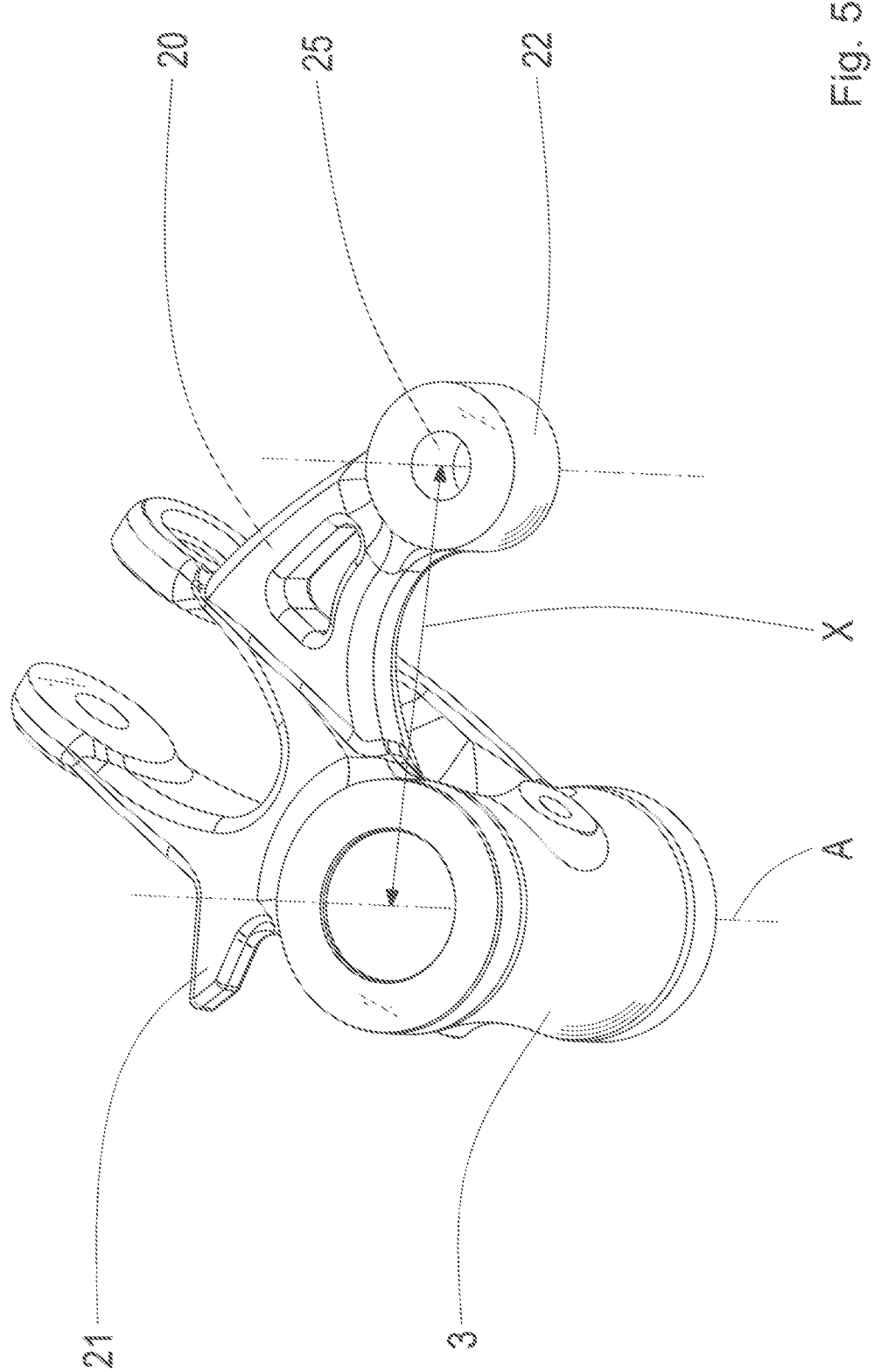
FIG. 5 is a perspective view of a spring support according to FIG. 4.

Although at least FIGS. 4 and 5 show a fastening lever 20 which is formed integral with the spring support and which is cast from the same material, the fastening lever 20 can, of course, just as easily be produced as a separate component part and can accordingly be connected to the spring support 3 by positive engagement and/or bonding and/or frictional engagement.

Figure 6:
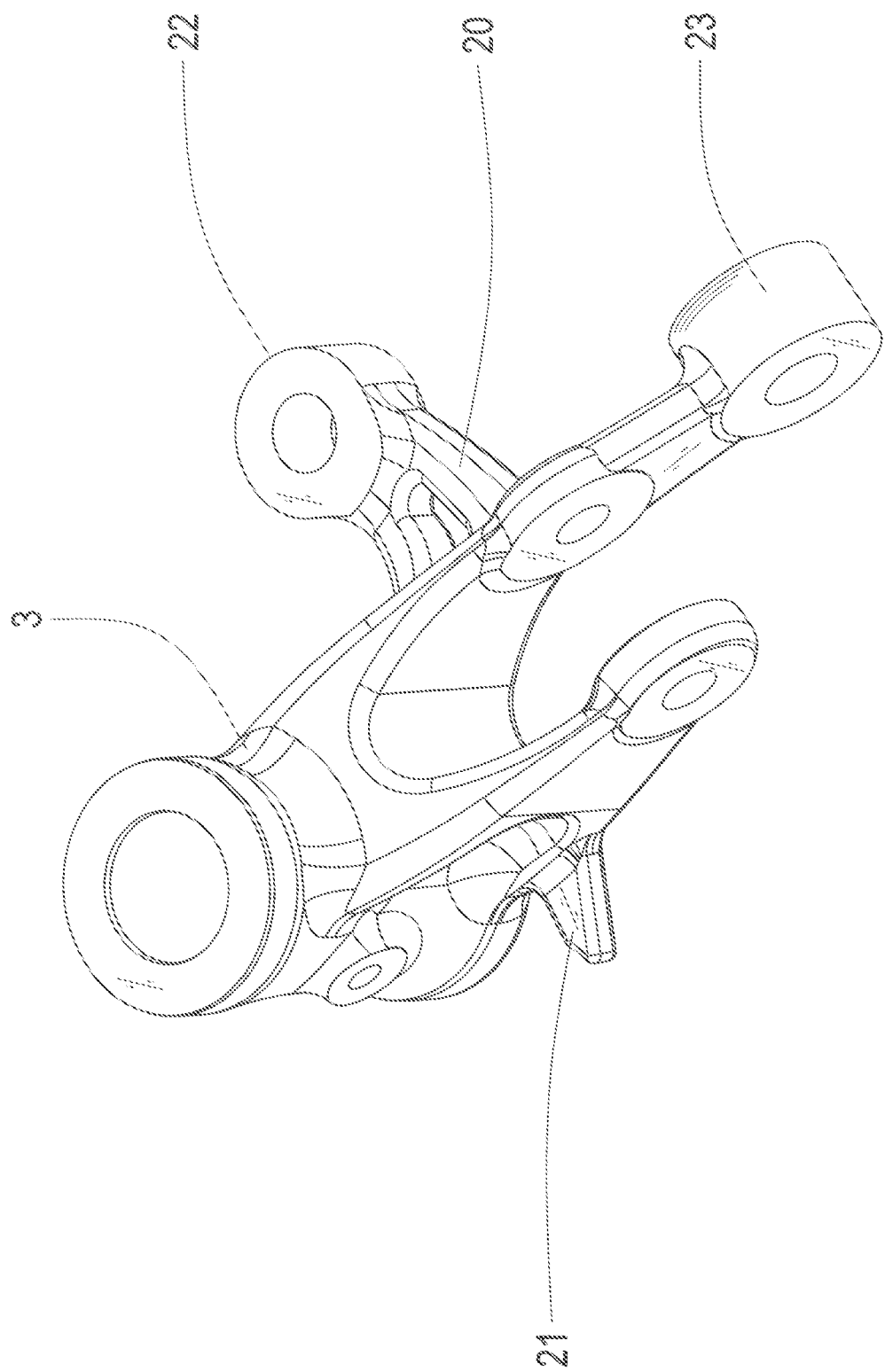
FIG. 6 is a perspective view of a spring support according to FIG. 4 and FIG. 5 comprising fastening arrangement for fastening a stabilizer.

A further possibility for constructing the fastening lever 20 is shown in FIG. 5; FIG. 6 and FIG. 7. The spring support 3 illustrated in these figures has steering stops 21 and 22, respectively, at a side of the spring support 3. These steering stops 21 and 22 serve as an end stop for the knuckle 2 which rotates around the longitudinal axis A of the knuckle pin as a result of a steering movement.

The fastening lever 20 is formed at at least one of the steering stops 21; 22 so that the fastening lever additionally assumes the function of the steering stop at this location.

It may also be advantageous to connect the safety component 15 directly to a steering stop without using an additional fastening lever. To this end, for example, a fastening opening 25 or a further fastening component can be formed or arranged directly at a steering stop 21; 22.

Further, the spring support 3 can have at least one fastening arrangement 23 for fastening a stabilizer to the spring support 3 as is shown in FIGS. 6 and 7.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. In an independent wheel suspension of a class wherein a knuckle is supported on a spring support which is to be connected to a vehicle body via a vibration damper and a supporting spring or via a spring-damper module, wherein the knuckle is connected to the spring support via a knuckle pin and is arranged so as to be mounted rotatably around a longitudinal axis (A) of the knuckle pin, wherein a tie rod is operatively connected to the knuckle, wherein the independent wheel suspension has at least one upper transverse control arm and at least one lower transverse control arm, wherein the transverse control arms are mounted at an upper end and a lower end, respectively, of the knuckle pin, wherein the knuckle and the transverse control arms are mounted in each instance by means of a joint operative along three axes, and the spring support is connected to the knuckle pin so as to be fixed with respect to rotation relative to the knuckle pin so that the knuckle pin connects the spring support, the knuckle and the at least one upper transverse control arm and the at least one lower transverse control arm together, wherein the improvement comprises that the independent wheel suspension comprises, a safety component constructed to prevent the knuckle pin from rotating in an uncontrolled manner around said longitudinal axis (A), a steering arm directly connected to said knuckle for affecting a steering movement;

a fastening lever non-rotatably connected to said spring support for fatening said safety component to said spring support;

said safety component having a first end portion and a second end portion, wherein one said first and second end portion of the safety component is mounted directly at said fastening lever and the other one of said first and second end portion is mounted at the vehicle body by a joint which is operative along at least one axis; and wherein said join at the at least one upper and lower transverse control arm is a ball joint or a molecular joint having a vertical axis coaxial with said longitudinal axis (A) of said knuckle pin.

2. The independent wheel suspension according to claim 1, wherein said joint at said first end portion and at said second end portion of said safety component is constructed as a joint operative along three axes.

3. The independent wheel suspension according to claim 1, additionally comprising at least one steering stop extending from said spring support, and wherein said fastening lever is formed at said at least one steering stop.

4. The independent wheel suspension according to claim 1, wherein said spring support has at least one fastening arrangement constructed for fastening a stabilizer to said spring support.

5. The independent wheel suspension according to claim 1, wherein said fastening lever defines a working distance (X) of said safety component from said longitudinal axis (A) of the knuckle pin.

6. The independent wheel suspension according to claim 5, wherein said fastening lever is connected to said spring support by positive engagement and/or bonding and/or frictional engagement.

7. The independent wheel suspension according to claim 5, wherein said fastening lever is formed integral with said spring support.

* * * * *